United States Patent
Inoue et al.

(10) Patent No.: US 7,154,836 B2
(45) Date of Patent: Dec. 26, 2006

(54) OPTICAL RECORDING/REPRODUCING METHOD AND OPTICAL RECORDING MEDIUM

(75) Inventors: Hiroyasu Inoue, Tokyo (JP); Koji Mishima, Tokyo (JP); Masaki Aoshima, Tokyo (JP); Hideki Hirata, Tokyo (JP); Hajime Utsunomiya, Tokyo (JP); Hitoshi Arai, Tokyo (JP); Yoshitomo Tanaka, Tokyo (JP)

(73) Assignee: TDK Corporation, Tokyo (JP)

(*) Notice: Subject to any disclaimer, the term of this patent is extended or adjusted under 35 U.S.C. 154(b) by 338 days.

(21) Appl. No.: 10/446,839

(22) Filed: May 29, 2003

(65) Prior Publication Data

US 2004/0027966 A1   Feb. 12, 2004

(30) Foreign Application Priority Data

Jun. 3, 2002  (JP)  ............................. 2002-162114
Feb. 13, 2003  (JP)  ............................. 2003-034916

(51) Int. Cl.
  *G11B 7/00*  (2006.01)

(52) U.S. Cl. .......................... 369/100; 369/94; 369/288

(58) Field of Classification Search ................ 369/100, 369/94, 288
See application file for complete search history.

(56) References Cited

U.S. PATENT DOCUMENTS 4,969,141 A * 11/1990 Takaoka et al. ............ 369/100
5,635,267 A *  6/1997 Yamada et al. ............ 428/64.4

FOREIGN PATENT DOCUMENTS

JP      A-62-204442      9/1987

OTHER PUBLICATIONS

National Technical Report vol. 28, No. 6, Dec. 1982 (w/ English Abstract).

* cited by examiner

Primary Examiner—Wayne Young
Assistant Examiner—Van T. Pham
(74) Attorney, Agent, or Firm—Oliff & Berridge, PLC (57) ABSTRACT

An optical recording/reproducing method and an optical recording medium capable of performing excellent optical recording with a simple structure in a recording layer made of environmentally friendly materials. The optical recording medium has a recording layer on a substrate. The recording layer has a pair of dielectric layers of which states are altered by a laser beam that is an energy beam of which intensity is modulated according to information to be recorded. This recording layer also has a assisting material layer sandwiched by these dielectric layers. The assisting material layer includes an element selected from Sn, Ti, Si, Bi, Ge, and C as a principle component, while the dielectric material as a base material for the dielectric layers is any one of ZnS, $SiO_2$, AlN, and $Ta_2O_5$.

4 Claims, 8 Drawing Sheets

OPTICAL RECORDING/REPRODUCING METHOD AND OPTICAL RECORDING MEDIUM

BACKGROUND OF THE INVENTION

1. Field of the Invention

The present invention relates to an optical recording medium and an optical recording/reproducing method using the same.

2. Related Art

As recording media for recording digital data, optical recording media such as CD (Compact Disc) and DVD (Digital Versatile Disc) have been widely used. These optical recording media can be broadly classified into the ROM-type optical recording media such as CD-ROM (Read Only Memory) and DVD-ROM where data is not added or rewritable, the write-once type optical recording mediae such as CD-R (Recordable) and DVD-R where data can be added but not rewritable, and the rewritable optical recording media such as CD-RW (Rewritable) and DVD-RW where data is rewritable.

As well known, in the ROM-type optical recording media, data is usually recorded in the form of pre-pits formed on the substrate during manufacturing. In the rewritable optical recording media, phase-change material, for example, is used as a material for the recording layer. In general, data is recorded by the use of a change in the optical characteristics caused by the phase change.

Meanwhile, in the write-once type optical recording media, organic dyes such as cyanine dyes, phthalocyanine dyes, and azo dyes are used in the recording layer. In general, data is recorded by the use of a change in the optical characteristics caused by its chemical change occasionally, a physical change may occur along with the chemical change).

Since organic dyes degrade when exposed to sunlight, for example, it is not easy to improve long-term storage reliability of the medium using such an organic dye in the recording layer thereof. To improve long-term storage reliability of the write-once type optical recording media, it is preferable to make the recording layer with a material other than organic dyes. As an example that has formed the recording layer with a material other than organic dyes, there is a technique to laminate two reaction layers to form a recording layer, as disclosed in Japanese Patent Laid-Open Publication No. Sho 62-204442.

In recent years, the data recording density has been raised and some next-generation type optical recording media capable of transmitting data at a very high rate have been proposed. In such next-generation optical recording media, the spot size of the laser beam used for recording/reproducing data must be focused small to accomplish a high-capacity, high-speed data transmission rate. In order to make the beam spot smaller, the numerical aperture (NA) of the object lens that focuses the laser beam must be 0.7 or larger, for example, near 0.85, and at the same time the wavelength, $\lambda$, of the laser beam must be 450 nm or shorter, for example, near 400 nm.

On the other hand, if the NA of the object lens is raised to focus the laser beam, such a problem arises that the tolerance of warpage and tilt of the optical recording medium, namely, the tilt margin becomes very small. The tilt margin, T, can be expressed by the following Equation (1):

$$T = \lambda/(d \cdot NA^3) \quad (1)$$

where the wavelength of the laser beam used in data recording/reproducing is $\lambda$ and the thickness of the light transmission layer (transparent substrate) working as the light path for the laser beam is d.

As the Equation (1) indicates, the tilt margin becomes smaller as the NA of the object lens grows. Meanwhile, the coefficient W of wave front aberration is expressed by the following Equation (2):

$$W = \{d \cdot (n^2-1) \cdot n^2 \cdot \sin\theta \cdot \cos\theta \cdot (NA)^z\} / \{2\lambda(n^2-\sin 2\theta)^{3/2}\} \quad (2)$$

where the refractivity of the light transmission layer (transparent substrate) where the wave front aberration (coma aberration) arises is n and the tilt angle is $\theta$.

As indicated by Equations (1) and (2), the thickness, d, of the light, transmission layer (transparent substrate) where the laser beam for data recording/reproducing comes in must be small to effectively prevent coma aberration while ensuring a large tilt margin.

For these reasons, it is important in the next-generation optical recording media to thin the light transmission layer (transparent substrate) to about 100 μm for preventing coma aberration while ensuring a sufficient tilt margin. Thus, in the next-generation type optical recording media, different from the currently-used optical recording media such as CD and DVD, it is difficult to form a recording layer and the like on the light transmission layer (transparent substrate). Instead, such a technique is under investigation that forms a thin resin film as the light transmission layer (transparent substrate) by the spin coating and other methods on the recording layer and the like formed on the substrate. For this purpose, in the manufacturing of the next-generation optical recording media, films are sequentially deposited from the opposite side of the laser incident face, unlike the currently used optical recording media where the films are sequentially deposited from the light incident side.

However, a problem is found that when the recording layer is made of two reaction layers deposited on the substrate in the next-generation optical recording media the noise level is likely to become high (the C/N ratio becomes small) during signal restoration, compared with the conventional optical recording media such as CD and DVD where the recording layer formed in the light transmission layer (transparent substrate) is made of two reaction layers.

Meanwhile, to meet the recent growing needs for environmental protection, the recording layer of the optical recording medium should be made of materials of a smaller environmental burden Furthermore, to improve the long-term storage reliability, the material for the recording layer of an optical recording medium should be sufficiently resistant to corrosion and degradation.

SUMMARY OF THE INVENTION

An object of the present invention is to provide a novel optical recording/reproducing method and an optical recording medium particularly useful to the recording/reproducing systems adopting next-generation type optical recording media.

As a result of an intensive study, the inventor has found that a simple film structure using environmentally friendly materials such as Sn and ZnS can provide excellent optical recording/reproducing characteristics.

Specifically, the above object is achieved by the following method and medium.

(1) An optical recording/reproducing method comprising the steps of:

forming at least a base material and an assisting material on a substrate;

externally applying energy of which intensity is modulated in accordance with information to be recorded, and thereby changing a state of at least one of the base material and the assisting material to change optical characteristics thereof; and reading a change in reflectivity resulting from the change in the optical characteristics to reproduce the information.

(2) An optical recording/reproducing method comprising the steps of:

forming on a substrate at least a base material of which state can be changed and an assisting material adjacent to each other;

externally applying to the base material and the assisting material energy of which intensity is modulated in accordance with information to be recorded, and thereby changing a state of at least one of the base material and the assisting material to change optical characteristics thereof; and reading a change in reflectivity resulting from the change in the optical characteristics to reproduce the information.

(3) The optical recording/reproducing method according to (1) or (2), wherein the base material is formed into a film-like form and the assisting material is formed adjacent thereto.

(4) An optical recording/reproducing method comprising the steps of:

forming on a substrate a film of a mixture of at least a base material of which state can be changed and an assisting material;

externally applying thereto energy of which intensity is modulated in accordance with information to be recorded, thereby changing a state of at least one of the base material and the assisting material to change optical characteristics thereof; and reading a change in the optical characteristics to reproduce the information.

(5) The optical recording/reproducing method according to (1), wherein the base material is formed into a film-like form and is mixed with the assisting material.

(6) The optical recording/reproducing method according to any one of (1) to (5), wherein a stabilizing material exists in the base material to stabilize a steady state thereof.

(7) The optical recording/reproducing method according to any one of (1)–(5), wherein the energy is provided by irradiating a laser beam.

(8) The optical recording/reproducing method according to (1), (4) or (5), wherein the assisting material contains one element selected from the group consisting of Sn, Ti, Si, Bi, Ge, C, V, W, Zr, Zn, Mg, Mn, Ag, Al, Nb, Au, Cu, and Ta.

(9) The optical recording/reproducing method according to (2) or (3), wherein the assisting material contains one element selected from the group consisting of Sn, Ti, Si, Bi, Ge, C, V, W, Zr, Zn, Mg, Mn, and Ag.

(10) An optical recording medium comprising:

a substrate; and a recording layer formed on the substrate, wherein the recording layer has an assisting material and a base material of which state is changed by externally applying energy of which intensity is modulated in accordance with information to be recorded.

(11) An optical recording medium comprises a substrate and a recording layer formed on the substrate, and this recording layer is composed of at least a base material of which state can be changed and an assisting material provided adjacent thereto. At least one of the base material and the assisting material causes a state change by externally applying energy of which intensity is modulated in accordance with information to be recorded and thereby causes a change in the optical characteristics. This change in the optical characteristics, in turn, causes a change in reflectivity.

(12) The optical recording medium of (10) or (11) where the base material is formed into a film-like form and the assisting material is formed adjacent thereto.

(13) The optical recording medium comprises a substrate and a recording layer formed on the substrate, and this recording layer is formed into a film-like form which is a mixture of an assisting material and a base material of which state can be changed. At least one of the base material and the assisting material causes a state change by externally applied energy of which intensity is modulated in accordance with information to be recorded and thereby causes a change in the optical characteristics.

(14) The optical recording medium of (10) or (13) where the base material is formed into a film-like form and is mixed with the assisting material.

(15) The optical recording medium of any one of (10)–(14.) where the energy is provided by irradiating a laser beam.

(16) The optical recording medium according to any one of (10)–(15), wherein the energy is applied by irradiating a laser beam.

(17) The optical recording medium according to (10), (13) or (14), wherein the assisting material contains one element selected from the group consisting of Sn, Ti, Si, Bi, Ge, C, V, W, Zr, Zn, Mg, Mn, Ag, Al, Nb, Au, Cu, and Ta.

(18) The optical recording medium according to (11) or (12) wherein the assisting material contains one element selected from the group consisting of Sn, Ti, Si, Bi, Ge, C, V, W, Zr, Zn, Mg, Mn, and Ag.

DESCRIPTION OF PREFERRED EMBODIMENTS OF THE INVENTION

Figure 1:
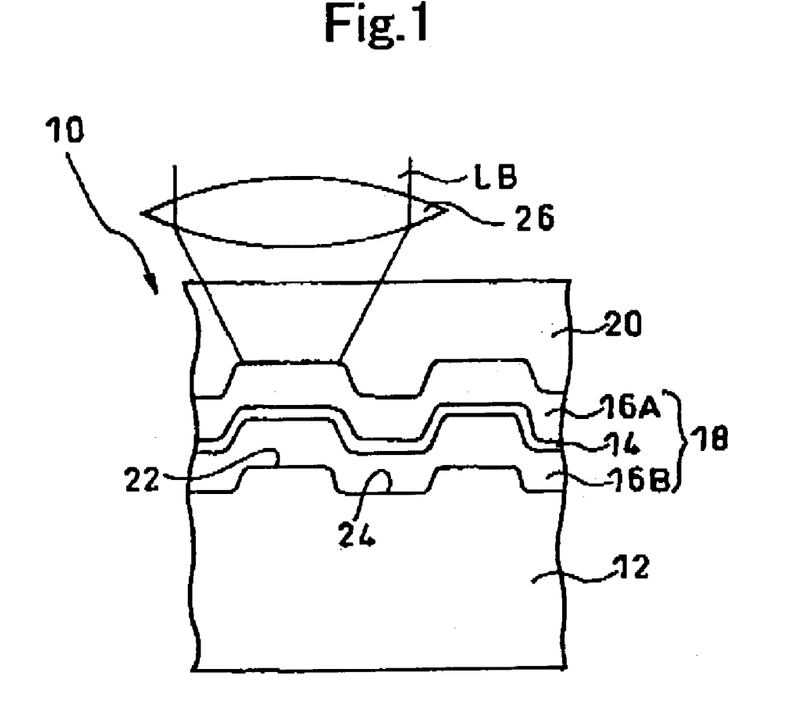
FIG. 1 is a schematic view showing an optical recording medium according to a first embodiment of the invention.

Now embodiments of the invention will be described in detail with reference to the accompanying drawings:

The optical recording medium 10 employed in the optical recording/reproducing method according to the present embodiments is the write-once type medium. As shown in FIG. 1, this medium is composed of a substrate 12, a recording layer 18, and a light transmission layer 20 stacked in this order. The recording layer 16 has an assisting material layer 14 and dielectric material layers (dielectric layers) 16A and 16B adjacent to the state-change assisting layer 14 on both sides thereof. The optical recording medium 10 has a hole in the center portion thereof. In the optical recording medium 10 of this structure, data recording/reproducing is performed by a laser beam LB irradiated from the side of the light transmission layer 20. The state-change assisting layer 14 may have either dielectric layer 16A or 16B only on one side.

The substrate 12 works as a base structure that provides a mechanical rigidity required of the optical recording medium 10. Grooves 22 and/or lands 24 are formed on the substrate surface. These grooves 22 and lands 24 work as guide tracks for the laser beam during data recording/reproducing.

The substrate 12 is about 1.1 mm thick and can be made of various materials such as glass, ceramics, and resin. Resin is a preferable material in terms of moldability. Examples of such resin include polycarbonate resin, acryl resin, epoxy resin, polystyrene resin, polyethylene resin, polypropylene resin, silicone resin, fluoride-based resin, ABS resin, and urethane resin. Particularly, polycarbonate resin is preferable in terms of processability and optical characteristics.

The dielectric layers 16A, 16B contains a state-change material as the base material. Optical characteristics including reflectivity of this material are varied due to energy by laser irradiation or the like.

The dielectric material as the base material may be any material as long as it can cause a state change. Its principle component can be, for example, oxides, sulfides, nitrides, or their combination. More specifically, its principle component should be at least one dielectric material selected from the group consisting of $Al_2O_3$, AlN, ZnS, GeN, GeCrN, $CeO_2$, SiO, $SiO_2$, $Si_3N_4$, and SiC. A dielectric material comprising $ZnS$—$SiO_2$ as principle components is particularly preferable.

Note that the "use of a dielectric material as a principle component" means that the content of such a dielectric material is the largest in the base material. Also note that "$ZnS$—$SiO_2$" means a mixture of ZnS and $SiO_2$.

The thickness of the dielectric layer is not limited; however, the thickness is preferably 5–200 nm. If it is thinner than 5 nm, a sufficient change in the optical characteristics such as reflectivity of the entire layer does not occur even when the base material has caused a sufficient change of state, and a sufficiently high C/N ratio is not provided. Meanwhile, if the layer is thicker than 200 nm, the time for film deposition becomes long and the productivity may decrease, and cracks are likely to be produced because of stress in the dielectric layers 16A and 16B. Also there will be a portion left which is not affected by the assisting material layer 14.

The assisting material layer 14 is exactly a layer that accelerates reactions in the base material, and formed adjacent to at least one of the dielectric layers 16A and 16B. When a laser beam of a power higher than a predetermined level is irradiated thereon, the elements of the assisting material layer 14 receive the laser heat and then work on the dielectric layers 16A and 16B. Then the layer constituting the dielectric layers 16A, 16B causes a state change in whole or in part (for example, from amorphous to crystalline) to provide recording marks. Then, the optical characteristics of the mixture portion where recording marks have been formed are distinctively different from those of the other portion in the recording layer 18. Therefore, data recording/reproducing can be performed by the use of this difference.

This change of state may accompany a change of state (crystal growth) specific to a material contained in the assisting material layer. This change of state will lead to improved C/N.

The assisting material layer 14 has at least one element selected from the group consisting of Sn, Ti, Si, Si, Ge, C, V, W, Zr, Zn, Mg, Mn, and Ag as a principle component.

The principle component should account for 50% or more in the elements constituting the assisting material layer 14, preferably 80 atomic percent (at %).

If it is lower than 50 at %, the effect of changing the state of the dielectric layer becomes insufficient and then C/N decreases. Furthermore, recording sensitivity lowers Because an insensitive recording film needs a high power laser for recording, the film itself is likely to be destructed and thereby storage reliability degrades.

Meanwhile, to lower the laser beam power to some extent for a smooth state change in the dielectric layer, the major element should account for 80 at % or more.

The thickness of the assisting material layer 14 should be 1–50 nm because it must be thick enough to cause a state change in the dielectric layers 16A, 16B when a laser beam is irradiated thereonto and the amount of heat must he increased if it is thicker than necessary. More preferably, its thickness is 2–30 nm.

The light transmission layer 20 is the layer working as the laser beam incident face and as a light path for the laser beam. Its thickness should be 10–300 μm, more preferably 50–150 μm. The material for the light transmission layer 20 is not limited, but acryl- or epoxy-based ultraviolet-curable resin is preferable. Instead of using an ultraviolet-curable resin film, a transparent sheet made of a transparent resin may be combined with glues and adhesives to form the light transmission layer 20.

Next explained is an example of how to manufacture the optical recording medium 10.

First, the second (second layer from the light incident side) dielectric layer 16B is formed on the substrate 12 where grooves 22 and lands 24 have been formed in advance. For the deposition of the second dielectric layer 16B, a vapor growth method using chemical species containing elements constituting the second dielectric layer 16B can be adopted. Such a vapor growth method may be the vacuum deposition method and sputtering method.

Next, the assisting material layer 14 is formed on the second dielectric layer 16B. This assisting material layer 14 can also be formed into a cluster state in the same manner as employed in forming the second dielectric layer 16B through a vapor growth process using chemical species containing elements constituting the assisting material layer 14. In addition, the first (first layer from the light incident side) dielectric layer 16A is formed on the assisting material layer 14. This first dielectric layer 16A can also be formed into a cluster state through a vapor growth process using chemical species containing elements constituting the first dielectric layer 16A.

Finally, the light transmission layer 20 is formed on the first dielectric layer 16A. The light transmission layer 20 can be formed by, for example, the spin coating method that uses acryl- or epoxy-based ultraviolet-curable resin of which viscosity has been optimized in advance and cures this resin film by ultraviolet irradiation. Then the manufacturing of the optical recording medium is completed.

The method of manufacturing the optical recording medium is not limited to the above example, but various techniques for manufacturing well-known optical recording media can be employed as well.

Now the optical recording/reproducing method using the above optical recording medium 10 will be described below.

Laser beam LB of a predetermined output power is irradiated onto the optical recording medium 10. The laser beam comes in the light transmission layer 20 and reaches the assisting material layer 14. It is preferred that the numerical aperture (NA) of the object lens that focuses laser beam LB should be 0.7 or higher, particularly 0.85 or so. It is preferred that the wavelength, $\lambda$, of laser beam LB should be 450 nm or shorter, particularly 405 nm or so. Then, it is preferable to make $\lambda/NA < 640$ nm.

By irradiation of laser beam LB, the elements constituting the assisting material layer 14 are heated by laser beam LB and these elements work on the adjacent dielectric layers 16A, 16B, causing a change of state (for example, it is from being amorphous to crystalline) in part or in whole to form recording marks. The optical characteristics of the portion where recording marks have been formed are distinctively different from those of the other portion (non-recorded portion). Therefore, when a laser beam for mark reading is irradiated onto these recorded portion and the non-recorded portion, their reflectivities differ from each other and thereby the recorded data can be read. In other words, data can be recorded/read through modification of the optical characteristics.

The present invention is not limited to the above embodiment and can be modified in various ways within the scope of the appended claims, and such modifications are also included in the present invention.

Figure 2:
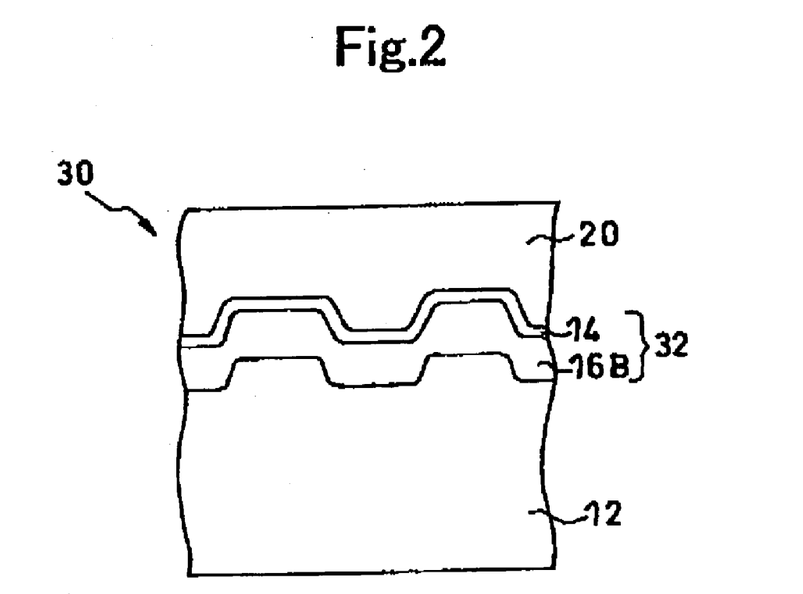
FIG. 2 is a schematic view showing an optical recording medium according to a second embodiment of the invention.

For example, although the assisting material layer 14 is sandwiched by the first and second dielectric layers 16A, 16B in the optical recording medium 10 according to the above embodiment, either dielectric layer 16A or 16B may be omitted when forming the recording layer 32 like the optical recording medium 30 in a second embodiment shown in FIG. 2.

In the optical recording media 10, 30 according to the above embodiments, the assisting material layer 14 is made of a single layer. The present invention, however, is not limited to this structure. The assisting material layer 14 may be made of two or more layers if the same effect as above can be provided.

Figure 3:
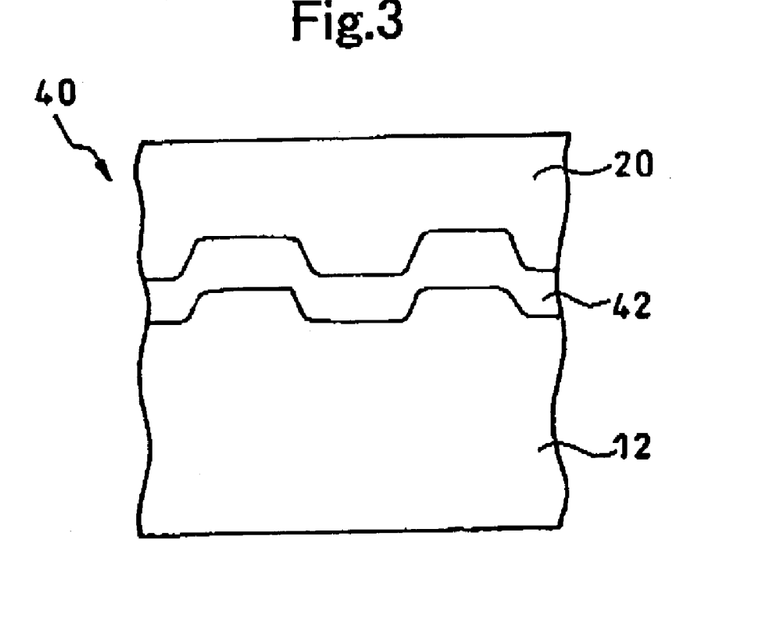
FIG. 3 is a schematic view showing an optical recording medium according to a third embodiment of the invention.

Now a third embodiment of the present invention will be described with reference to FIG. 3.

The optical recording medium 40 according to the third embodiment of the invention includes a single-layered recording layer 42 with no dielectric layer being formed on the substrate 12. The recording layer 42 is made of a mixture of a dielectric material working as a base material and a state-change assisting material. Specifically, the preferable dielectric material is at least one selected from the group consisting of $Al_2O_3$, AlN, ZnS, GeN, GeCrN, $CeO_2$, SiO, $SiO_2$, SiC, ZnO, MgO, MgF, $Ta_2O_5$, $La_2SiON$, $Si_3N_4$, $TiO_2$, and InSnO as a principle component. The preferable state-change assisting material is at least one material selected from the group consisting of Sn, Ti, Si, Bi, Ge, C, V, W, Zr, Zn, Mg, Mn, Ag, Al, Nb, Au, Cu, and Ta. The single-layered recording layer 42 is made of a mixture of such a dielectric material and a state-change assisting material. The surface of this recording medium 42 is covered with the light transmission layer 20 as is the case with the above embodiments.

The recording layer 42 is made into a film which is a mixture of a dielectric material and an assisting material and presents an amorphous state or fine crystalline state including two elements. Otherwise, the dielectric material and the assisting material may be deposited alternatively by a vapor deposition method to form the recording layer. The thickness of the recording layer 42 should be 1–100 nm, preferably 2–50 nm.

When a laser beam is irradiated onto the optical recording medium 40 of the above structure, the assisting material in the dielectric material causes changing its optical characteristics as in the case of the optical recording medium 10 of FIG. 1.

As a result, the reflectivity of the recording layer 42 and other characteristics are changed. The reflectivity is modified in accordance with the power of the incident laser beam (and irradiation time).

The above optical recording medium 10, 30, and 40 do not have a reflection layer on the substrate 12. However, to enhance the laser reflection from the recorded portion having recording marks and the non-recorded portion, a reflection layer 52 may be formed as in the case of the optical recording medium 50 shown in FIG. 4.

Figure 4:
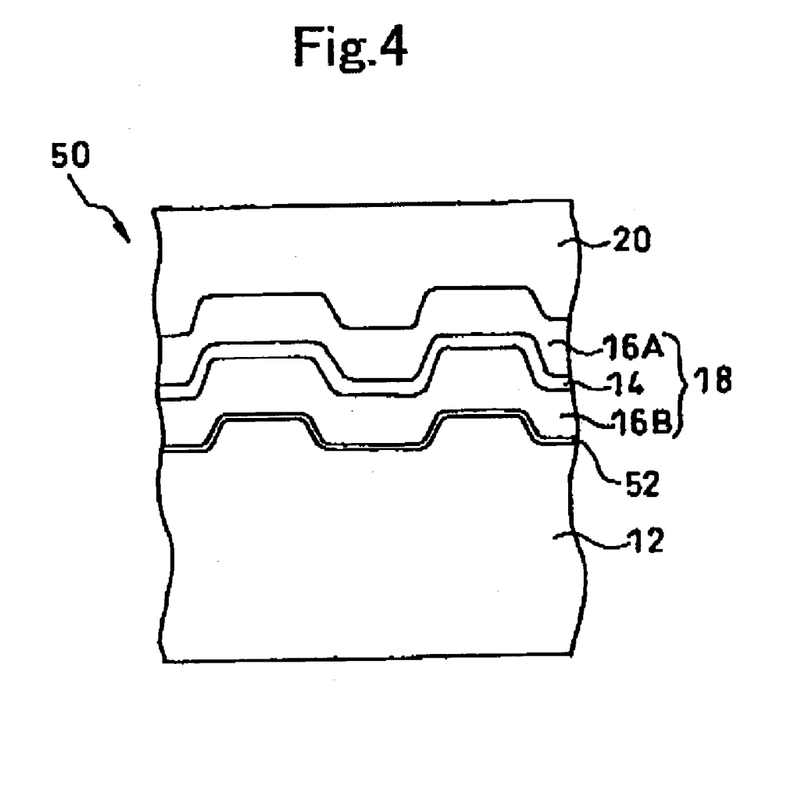
FIG. 4 is a schematic view showing an optical recording medium according to a fourth embodiment of the invention.

The reflection layer 52 reflects the laser beam coming in from the side of the light transmission layer 20 and reflects it therethrough. Its thickness should be 5–300 nm, preferably 10–200 nm. The material for the reflection layer 52 is not particularly limited as long as it can reflect laser beams; for example, it can be Mg, Al, Ti, Cr, Fe, Co, Ni, Cu, Zn, Ge, Ag, Pt or Au. Because of high reflectivity, metallic materials such as Al, Au, Ag, or Cu, or their alloys (for example, Ag—Cu alloy) are particularly preferable. If the reflection layer 52 is formed, a high signal restoring ratio (C/N ratio) is easily attained after optical recording by virtue of the multi-interference effect.

EXAMPLES AND COMPARED EXAMPLES

Now the present invention will be explained more specifically along with some examples, but the invention is not limited to those examples.

[Preparation of the Optical Recording Medium]

Example(s) 1–3

Optical recording media were fabricated via the following steps.

First, a polycarbonate substrate of which thickness was 1.1 mm and diameter was 120 mm was set in a sputtering apparatus. On the light reflection layer (only in example 2) of this polycarbonate substrate, the second dielectric layer made of a mixture of ZnS and $SiO_2$, the assisting material layer made of Sn and the first dielectric layer (only in examples 1 and 2) made of a mixture of ZnS and $SiO_2$ were formed one after another by the sputtering method.

Next, on the first dielectric layer, an acrylic ultraviolet-curable resin was coated by the spin coating method and the light transmission layer (thickness: 100 μm) was formed by ultraviolet irradiation thereon.

The molar ratio between ZnS and $SiO_2$ in the first and second dielectric layers was $ZnS:SiO_2=80:20$.

Example(s) 4–14

The optical recording medium was fabricated from the dielectric layers, the substrate and the light transmission layer which were fabricated in the same manner as in the example 1 and from the assisting material layer which was a metal other than Sn or a semi-metal.

Compared Example(s) 1–3

The optical recording medium was fabricated with the same conditions as the examples 4–14 except that the material for the assisting material layer was changed.

Examples 15

The optical recording medium with a single-layered recording layer was fabricated without forming any dielectric layer. The recording layer was made of a mixture of Sn and a dielectric material of $ZnS:SiO_2=80:20$.

Example(s) 16, 17

The optical recording medium was fabricated in the same manner as the example 15 except that Sn employed in the example 15 was replaced by Ag or Ti.

Compared Example 4

The optical recording medium was fabricated in the same manner as the example 15 except that $ZnS—SiO_2$ in the example 15 was omitted.

Example(s) 18–21

The optical recording medium was fabricated by changing the material for the dielectric layer and forming the state-change assisting layer made of Sn.

Example(s) 22–30

The optical recording medium with a recording layer of a single-layer structure was fabricated without forming any dielectric layer. The recording layer was made of a mixture of $ZnS—SiO_2$ ($ZnS:SiO_2=80:20$) and a metal or semi-metal of Mg, Nb, Bi, Mg, Au, Al, Au, Cu, Ta, or Si.

Example(s) 31–52

The optical recording media were fabricated by replacing $ZnS—SiO_2$ ($ZnS:SiO_2=80:20$) employed in the examples 22–30 to other materials. Mg (examples 31–35), Ti (examples 36–43), Sn (examples 44, 45), Nb (examples 46–48), or Al (examples 49–52) was mixed in the optical recording medium.

Example(s) 53–55

The optical recording medium with a recording layer of a single-layer structure was fabricated without forming any dielectric layer. The recording layer was made of a mixture of Zn and other materials. The other materials are ZnS, ZnO and $ZnS:SiO_2(80:20)$.

[Recording/Reproducing]

The above fabricated optical recording media were each set in an optical disk tester (trade name. DDU1000 manufactured by Pulstec Industrial Co., Ltd.). A recording laser beam having a wavelength of 405 nm (blue) and an object lens with an NA (numerical aperture) of 0.85 were employed in the individual optical recording media in common. This laser beam was focused with a focusing lens installed in the recording head and then irradiated from the light transmission layer side onto the optical recording medium for optical recording.

The conditions for signal recording were that the modulation mode was (1, 7) RLL, the channel bit length was 0.12 μm, the linear recording rate was 5.3 m/s, the channel clock was 66 Hz, and the recorded signals were 8T.

Next, the information recorded with the aforementioned optical disk tester was reproduced and the C/N ratio of read signals was measured for each of the optical recording media fabricated in the individual examples and compared examples where the material for the assisting material layer, the material for the dielectric layer, and film thickness were varied. In the reading apparatus, the wavelength of the laser beam used in reproduction was 405 nm, the NA (numerical aperture) of the object lens was 0.85, and the laser beam output power was 0.3 mW.

The test results are listed in Tables 1–9.

TABLE 1

|  | Example 1 | Example 2 | Example 3 |
| --- | --- | --- | --- |
| Film structure |  |  |  |
| First dielectric layer | 80:20 (96 nm) | 80:20 (30 nm) |  |
| Assisting material layer | Sn (3.5 nm) | Sn (3 nm) | Sn (6 nm) |
| Second dielectric layer | 80:20 (78 nm) | 80:20 (30 nm) | 80:20 (60 nm) |
| Reflection layer |  | APC (100 nm) |  |
| 8T C/N (dB) | 54 | 53.6 | 53.2 |

"80:20" means the molar ratio of $ZnS:SiO_2$ in $ZnS + SiO_2$.
Notation "$ZnS:SiO_2$" is omitted in the table.
Figure in ( ) indicates the layer thickness.

TABLE 2

|  | Example 4 | Example 5 | Example 6 | Example 7 | Example 8 | Example 9 | Example 10 |
| --- | --- | --- | --- | --- | --- | --- | --- |
| Film structure |  |  |  |  |  |  |  |
| First dielectric layer | 80:20 (20 nm) | 80:20 (20 nm) | 80:20 (20 nm) | 80:20 (20 nm) | 80:20 (60 nm) | 80:20 (20 nm) | 80:20 (20 nm) |
| Assisting material layer | Ti (10 nm) | Bi (6 nm) | Ge (12 nm) | Si (10 nm) | C (12 nm) | V (10 nm) | W (10 nm) |
| Second dielectric layer | 80:20 (20 nm) | 80:20 (20 nm) | 80:20 (60 nm) | 80:20 (60 nm) | 80:20 (60 nm) | 80:20 (20 nm) | 80:20 (20 nm) |
| Reflection layer |  |  |  |  |  |  |  |
| 8T C/N (dB) | 61.3 | 47.1 | 48.1 | 40.1 | 38.2 | 45.6 | 31 |

"80:20" means the molar ratio of $ZnS:SiO_2$ in $ZnS + SiO_2$.
Notation "$ZnS:SiO_2$" is omitted in the table.
Figure in ( ) indicates the layer thickness.

TABLE 3

|  | Example 11 | Example 12 | Example 13 |
|---|---|---|---|
| Film structure |  |  |  |
| First dielectric layer | 80:20 (20 nm) | 80:20 (20 nm) | 80:20 (20 nm) |
| Assisting material layer | Zr (10 nm) | Zn (10 nm) | Mg (10 nm) |
| Second dielectric layer Reflection layer | 80:20 (20 nm) | 80:20 (20 nm) | 80:20 (20 nm) |
| 8T C/N (dB) | 51.7 | 37.8 | 48.3 |

|  | Example 14 | Compared example 1 | Compared example 2 |
|---|---|---|---|
| Film structure |  |  |  |
| First dielectric layer | 80:20 (20 nm) | 80:20 (20 nm) | 80:20 (60 nm) |
| Assisting material layer | Mn (10 nm) | Al (10 nm) | Cu (10 nm) |
| Second dielectric layer Reflection layer | 80:20 (20 nm) | 80:20 (20 nm) | 80:20 (60 nm) |
| 8T C/N (dB) | 55.1 | 1.6 | 2.4 |

|  | Compared example 3 |
|---|---|
| Film structure |  |
| First dielectric layer | 80:20 (60 nm) |
| Assisting material layer | Au (12 nm) |
| Second dielectric layer Reflection layer | 80:20 (60 nm) |
| 8T C/N (dB) | — |

"80:20" means the molar ratio of $ZnS:SiO_2$ in $ZnS + SiO_2$.
Notation "$ZnS:SiO_2$" is omitted in the table.
Figure in ( ) indicates the layer thickness.

TABLE 4

|  | Example 15 | Example 16 | Example 17 | Compared example 4 |
|---|---|---|---|---|
| Film structure |  |  |  |  |
| Recording layer Reflection layer | Sn + 80:20 (10 nm) | Ag + 80:20 (10 nm) | Ti + 80:20 (30 nm) | Sn (6 nm) |
| 8T C/N (dB) | 51.1 | 43.4 | 51.2 | 29.1 |

|  | Example 18 | Example 19 | Example 20 | Example 21 |
|---|---|---|---|---|
| Film structure |  |  |  |  |
| First dielectric layer | $Ta_2O_5$ (60 nm) | AlN (60 nm) | ZnS (60 nm) | $S_iO_2$ (60 nm) |
| Assisting material layer | Sn (6 nm) | Sn (6 nm) | Sn (6 nm) | Sn (12 nm) |
| Second dielectric layer Reflection layer | $Ta_2O_5$ (60 nm) | AlN (60 nm) | ZnS (60 nm) | $S_iO_2$ (60 nm) |
| 8T C/N (dB) | 48.8 | 40.1 | 49.2 | 49.2 |

"80:20" means the molar ratio of $ZnS:SiO_2$ in $ZnS + SiO_2$.
Notation "$ZnS:SiO_2$" is omitted in the table.
Figure in ( ) indicates the thickness of the entire recording layer.
Figure in ( ) indicates each layer thickness

TABLE 5

|  | Example 22 | Example 23 | Example 24 |
|---|---|---|---|
| Film structure |  |  |  |
| Recording layer Reflection layer | 80:20 + Mg (30 nm) | 80:20 + Nb (50 nm) | 80:20 + Bi (10 nm) |
| 8T C/N (dB) | 55.7 | 50.2 | 51.2 |

|  | Example 25 | Example 26 | Example 27 |
|---|---|---|---|
| Film structure |  |  |  |
| Recording layer Reflection layer | 80:20 + MgAu (30 nm) | 80:20 + Al (15 nm) | 80:20 + Au (20 nm) |
| 8T C/N (dB) | 52.8 | 55.4 | 48.9 |

|  | Example 28 | Example 29 | Example 30 |
|---|---|---|---|
| Film structure |  |  |  |
| Recording layer Reflection layer | 80:20 + Cu (15 nm) | 80:20 + Ta (20 nm) | 80:20 + Si (40 nm) |
| 8T C/N (dB) | 49.5 | 46.6 | 48.6 |

"80:20" means the molar ratio of $ZnS:SiO_2$ in $ZnS + SiO_2$.
Notation "$ZnS:SiO_2$" is omitted in the table.
Figure in ( ) indicated the thickness of the entire recording layer.

TABLE 6

|  | Example 31 | Example 32 | Example 33 |
| --- | --- | --- | --- |
| Film structure | | | |
| Recording layer | MgO + Mg (30 nm) | MgF + Mg (30 nm) | SiO2 + Mg (20 nm) |
| Reflection layer | | | |
| 8T C/N (dB) | 35.1 | 48.2 | 55.4 |
|  | Example 34 | Example 35 | |
| Film structure | | | |
| Recording layer | ZnS + Mg (20 nm) | LaSiON + Mg (15 nm) | |
| Reflection layer | | | |
| 8T C/N (dB) | 52 | 52.3 | |

Figure in ( ) indicates the thickness of the entire recording layer.

TABLE 7

|  | Example 36 | Example 37 | Example 38 |
| --- | --- | --- | --- |
| Film structure | | | |
| Recording layer | Si3N4 + Ti (50 nm) | ZnS + Ti (30 nm) | TiO2 + Ti (30 nm) |
| Reflection layer | | | |
| 8T C/N (dB) | 42.3 | 50.1 | 48.3 |
|  | Example 39 | Example 40 | Example 41 |
| Film structure | | | |
| Recording layer | SiO2 + Ti (50 nm) | SiC + Ti (30 nm) | 80:20 + Ti (10 nm) |
| Reflection layer | | | |
| 8T C/N (dB) | 44.7 | 51.6 | 51.2 |

TABLE 7-continued

|  | Example 42 | Example 43 |
| --- | --- | --- |
| Film structure | | |
| Recording layer | 50:50 + Ti (10 nm) | Ta2O5 + Ti (35 nm) |
| Reflection layer | | |
| 8T C/N (dB) | 45.4 | 48.5 |

"80:20" and "50:50" mean the molar ratio of ZnS:SiO$_2$ in ZnS + SiO$_2$.
Notation "ZnS:SiO$_2$" is omitted in the table.
Figure in ( ) indicates the thickness of the entire recording layer.

TABLE 8

|  | Example 44 | Example 45 | Example 46 |
| --- | --- | --- | --- |
| Film structure | | | |
| Recording layer | InSnO + Sn (50 nm) | 80:20 + Sn (10 nm) | 80:20 + Nb (50 nm) |
| Reflection layer | | | |
| 8T C/N (dB) | 40.9 | 32.1 | 50.2 |
|  | Example 47 | Example 48 | Example 49 |
| Film structure | | | |
| Recording layer | Ta2O5 + Nb (25 nm) | TiO2 + Nb (35 nm) | 80:20 + Al (15 nm) |
| Reflection layer | | | |
| 8T C/N (dB) | 45.4 | 54.6 | 55.4 |
|  | Example 50 | Example 51 | Example 52 |
| Film structure | | | |
| Recording layer | LaSiON + Al (40 nm) | Ta2O5 + Al (25 nm) | TiO2 + Al (35 nm) |
| Reflection layer | | | |
| 8T C/N (dB) | 49.3 | 50.5 | 48.9 |

"80:20" means the molar ratio of ZnS:SiO$_2$ in ZnS + SiO$_2$.
Notation "ZnS:SiO$_2$" is omitted in the table.
Figure in ( ) indicates the thickness of the entire recording layer.

TABLE 9

|  | Example 53 | Example 54 | Example 55 |
|---|---|---|---|
| Film structure Recording layer | ZnS + Zn (30 nm) | ZnO + Zn (30 nm) | 80:20 + Zn (30 nm) |
| 8T C/N (dB) | 47 | 48.2 | 49.5 |

"80:20" means the molar ratio of ZnS:SiO$_2$ in ZnS + SiO$_2$.
Notation "ZnS:SiO$_2$" is omitted in the table.
Figure in ( ) indicates the thickness of the entire recording layer.

As indicated in these tables, the C/N ratio was 35 dB or higher in the examples 1–55, and optical recording/reproducing was possible enough to perform by the use of those optical recording media.

When observing some recorded and non-recorded portions in the optical recording media of the examples 1 and 15 with a transmission electron microscope, crystals of ZnS and Sn were recognized in the recorded portions. The X-ray diffraction pattern also indicated the crystallization of ZnS and Sn after recording.

In this measurement of X-ray diffraction, the X-ray was Cu—Kα, and the tube voltage and tube current were 50 kV and 300 mA, respectively. The JCPDS cards were used to identify the diffraction peaks. For example, β-Sn is numbered 04-0673 and the positions of its diffraction peaks are known with reference to the card.

Figure 5A:
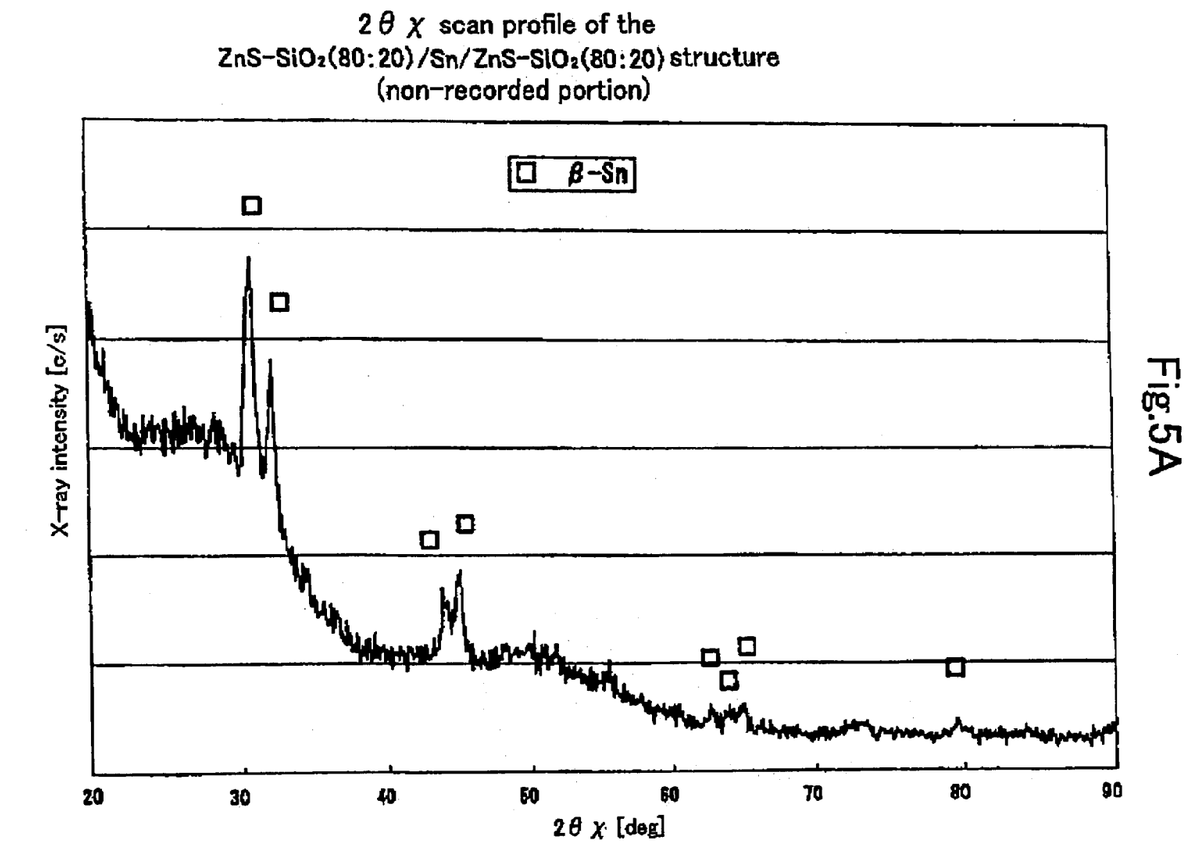
FIG. 5A is an X-ray diffraction pattern of a non-recorded portion of the optical recording medium of the example 1.
Figure 5B:
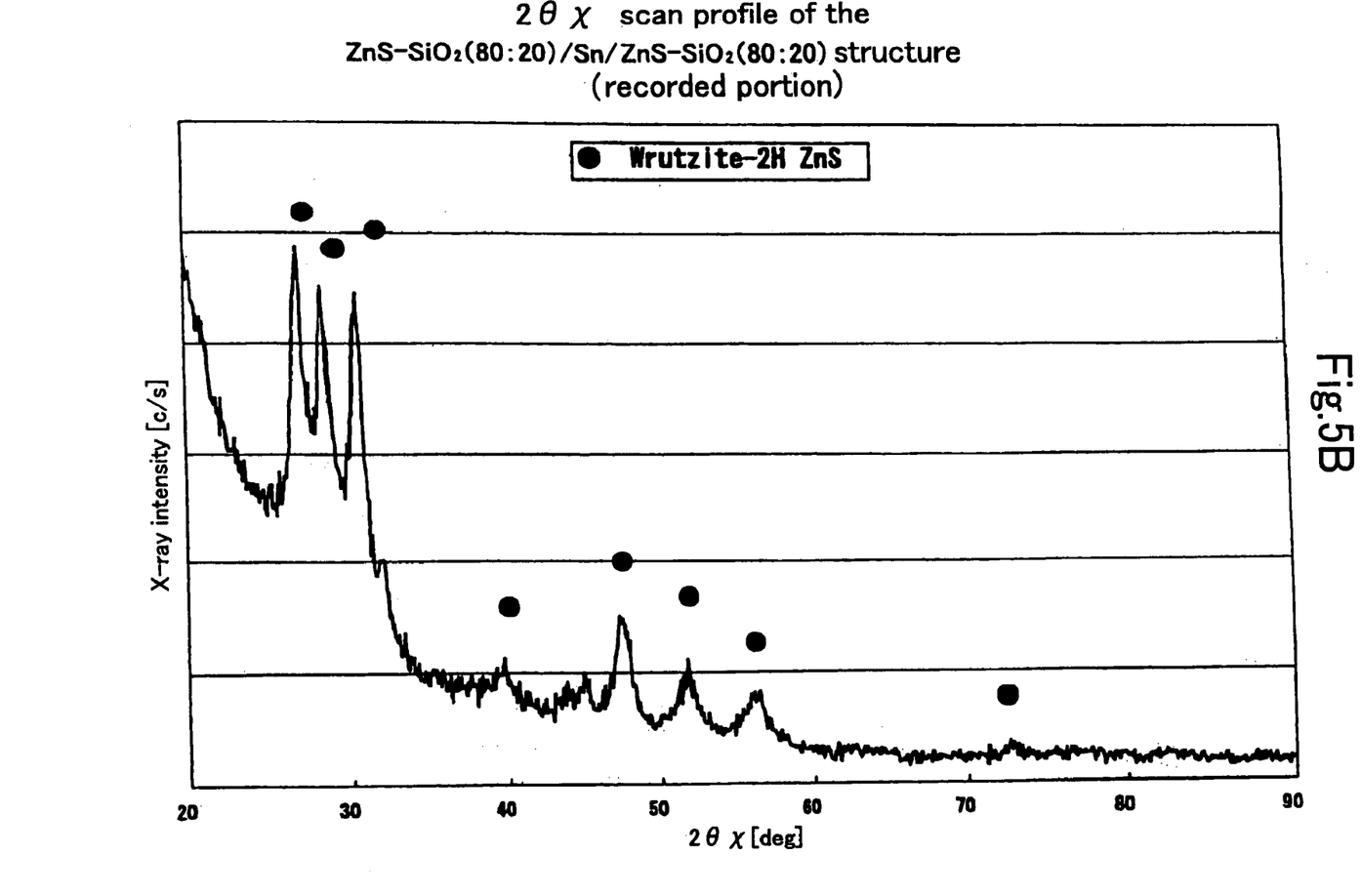
FIG. 5B is an X-ray diffraction pattern of a recorded portion of the optical recording medium of the example 1.

Under the structure described in the example 1 (ZnS—SiO$_2$(80:20)/Sn/ZnS—SiO$_2$(80:20) layered structure), the recorded portion and the non-recorded portion were analyzed by the X-ray diffraction (FIGS. 5A and 5B).

A diffraction peak of β-Sn and a broad peak of ZnS are observed in the diffraction pattern of the non-recorded portion (FIG. 5A). Thus it is understood that this Sn is crystalline while this ZnS is amorphous. On the other hand, the recorded portion (FIG. 5B) showed a sharp diffraction peak of ZnS, indicating crystallization of ZnS. With respect to Sn, the diffraction peak of β-Sn was observed as well, while the diffraction peaks of SnO$_2$ or SnS were not observed.

Figure 6A:
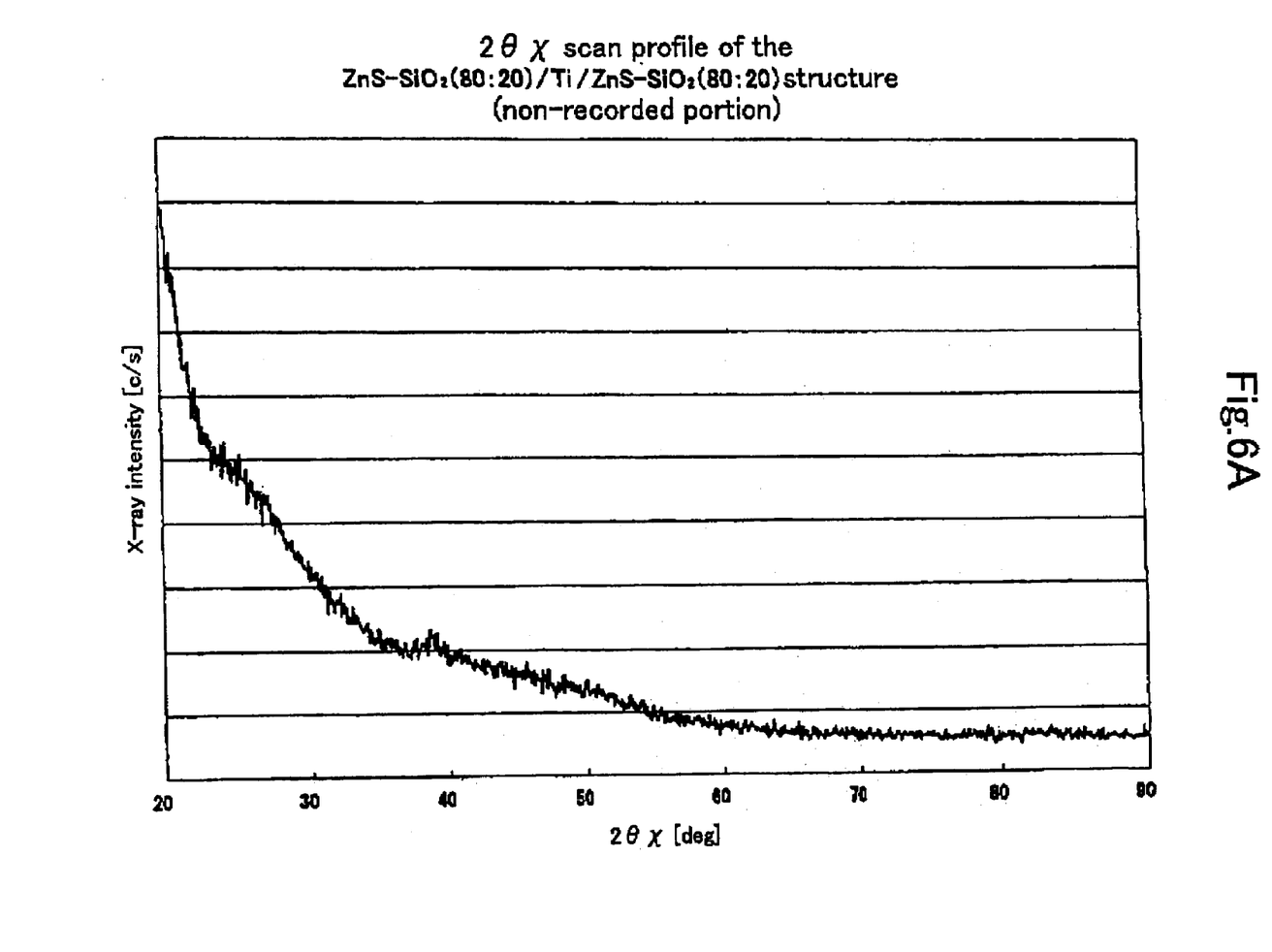
FIG. 6A is an X-ray diffraction pattern of a non-recorded portion of the optical recording medium of the example 4.
Figure 6B:
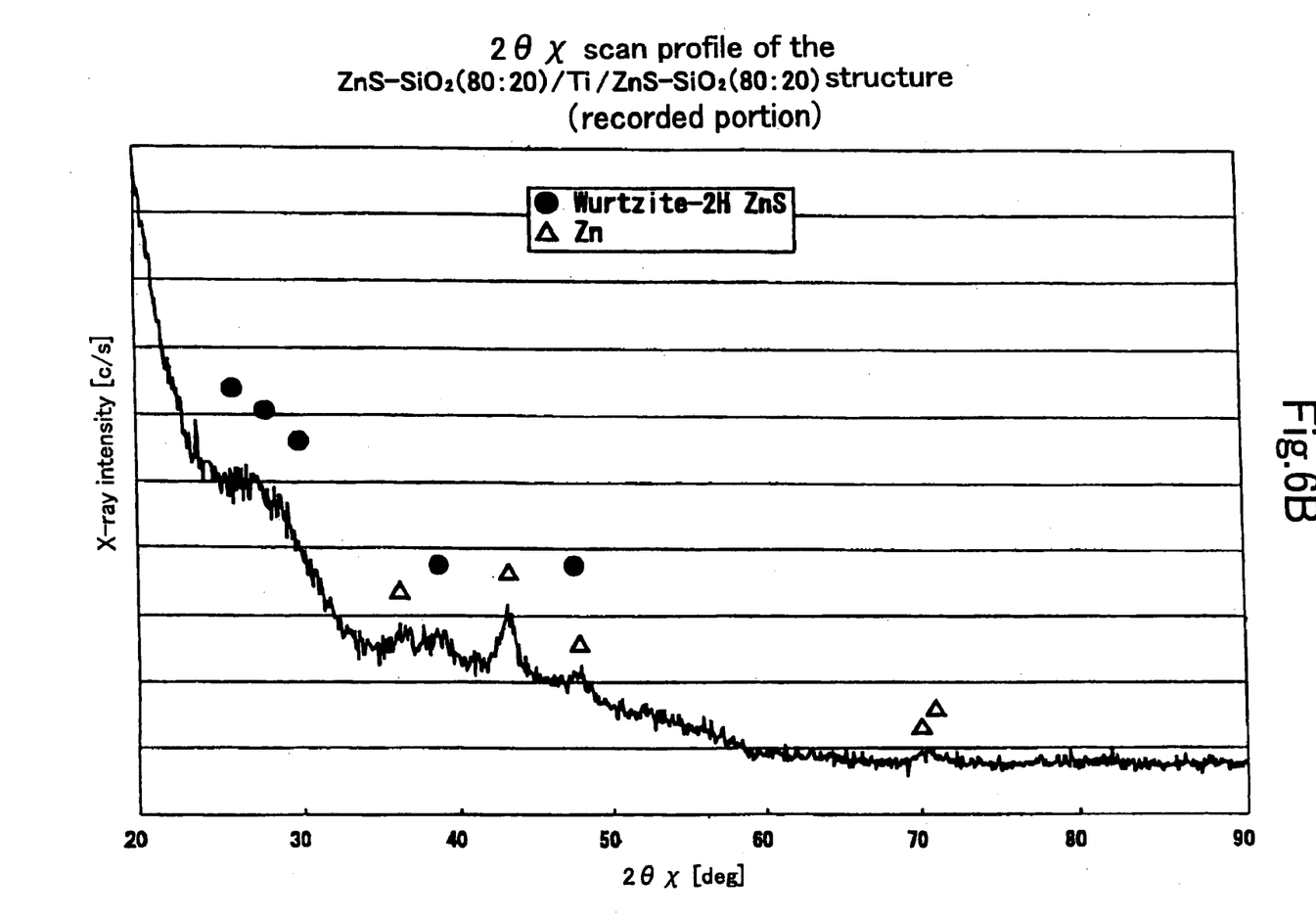
FIG. 6B is the X-ray diffraction pattern of a recorded portion of the optical recording medium of the example 4.

The recorded portion and non-recorded portion of the structure of the example 4 (ZnS—SiO$_2$(80:20)/Ti/ZnS—SiO$_2$(80:20) layered structure) were analyzed by the X-ray diffraction (see FIGS. 6A and 6B).

The non-recorded portion (FIG. 6A) shows a trace of broad ZnS diffraction peaks. No diffraction peak of Ti is recognized. This implies that the ZnS is amorphous. After recording (FIG. 6B), two or more ZnS peaks are observed, suggesting crystallization. The Zn diffraction peaks indicate that ZnS and Zn are crystallized by recording.

Figure 7A:
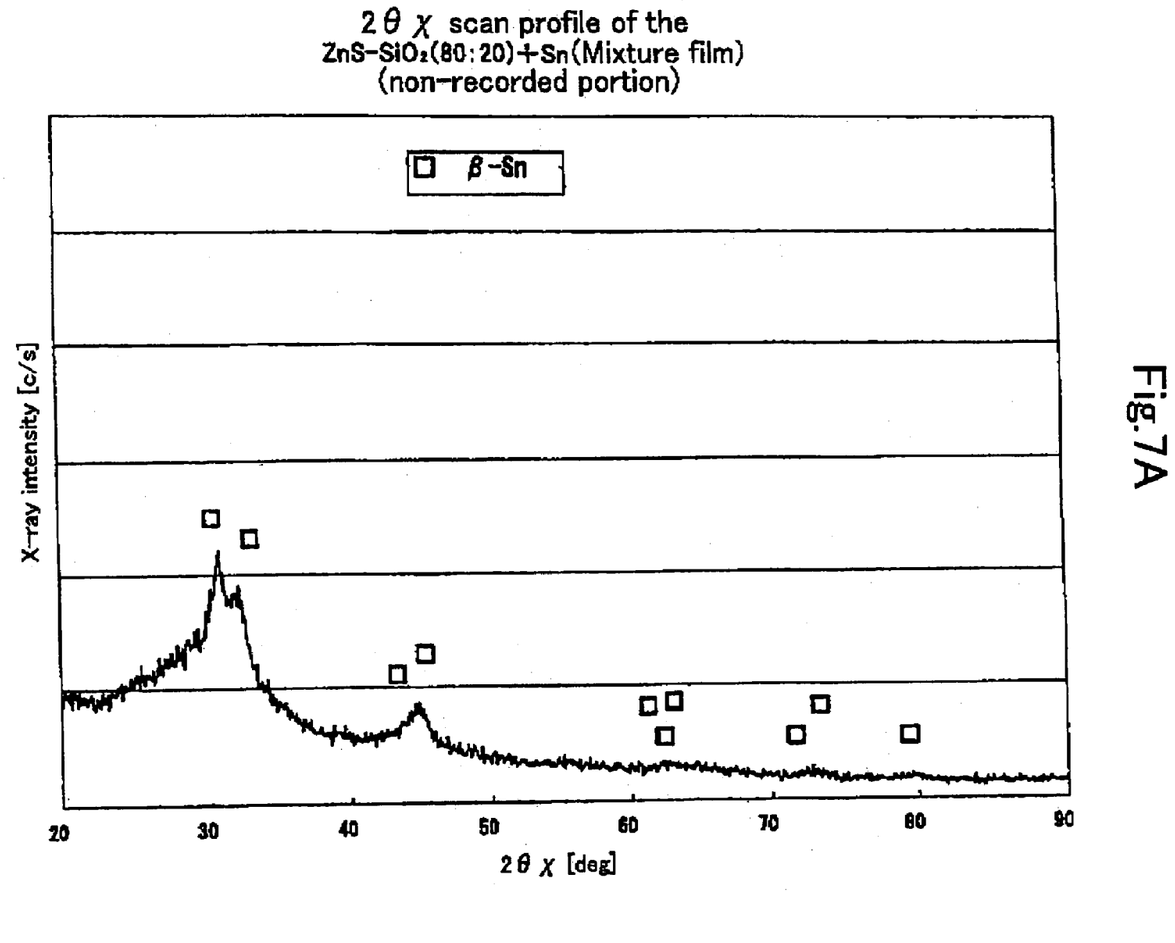
FIG. 7A is the X-ray diffraction pattern of a non-recorded portion of the optical recording medium of the example 15.
Figure 7B:
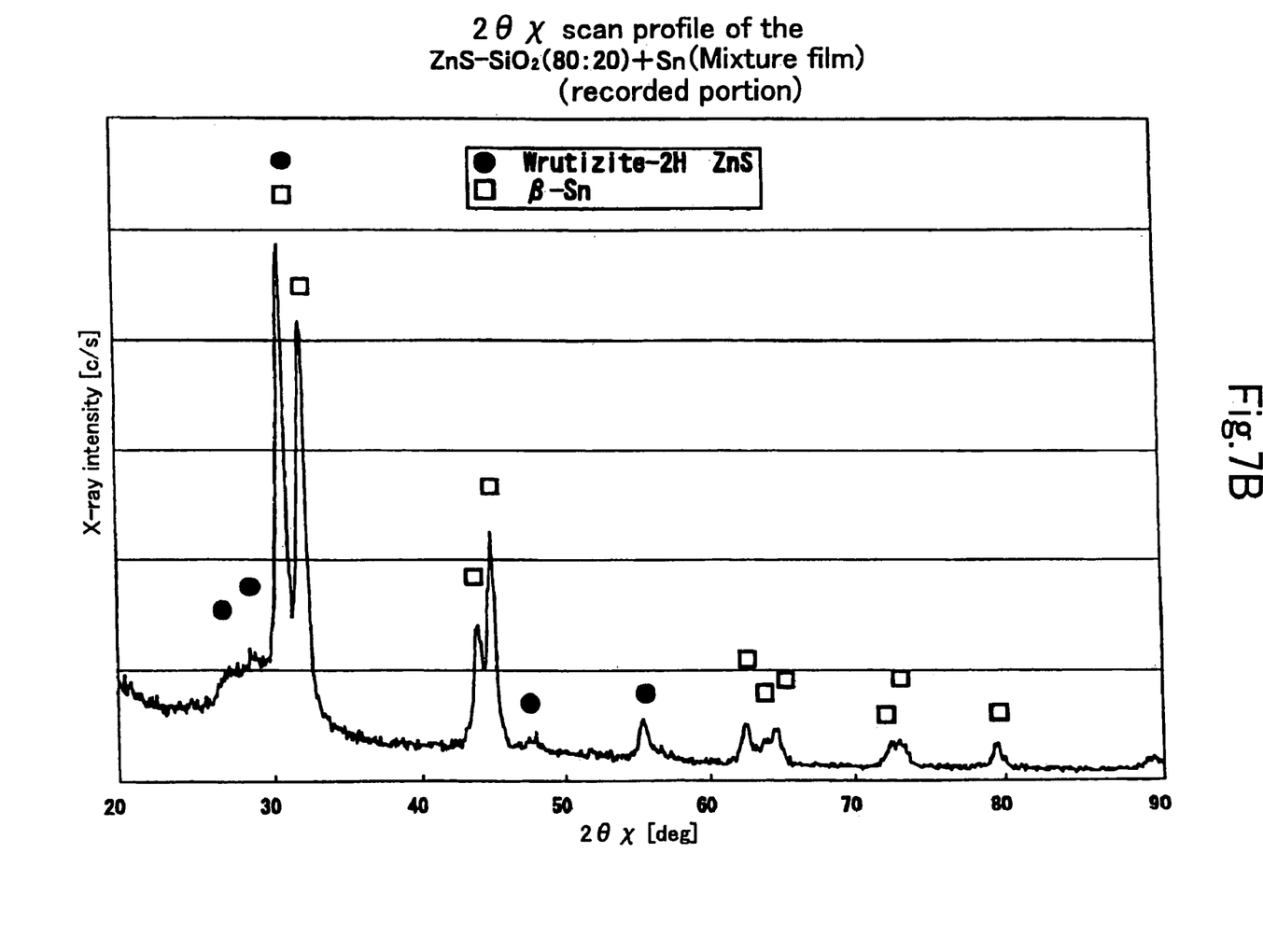
FIG. 7B is the X-ray diffraction pattern of a recorded portion of the optical recording medium of the example 15.

The recorded portion and non-recorded portion of the structure of the example 15 (mixture of ZnS—SiO$_2$(80:20) and Sn) were analyzed by the X-ray diffraction (see FIGS. 7A and 7B).

The non-recorded portion (FIG. 7A) shows β-Sn diffraction peaks, while almost no diffraction peak of ZnS is recognized. This implies that the Sn is crystalline. After recording (FIG. 7B), sharp diffraction peaks of β-Sn appear, suggesting crystallization of Sn. Many diffraction peaks of ZnS suggest that the crystallization of ZnS proceeds by recording.

As described above, the optical recording/reproducing method and optical recording medium of the present invention enable to record/read data with a simple structure in a novel manner not adopted in the past while reducing environmental loads.

What is claimed is:

1. An optical recording/reproducing method comprising the steps of:
    forming on a substrate at least a base material of which state can be changed and an assisting material adjacent to each other;
    externally applying to the base material and the assisting material energy of which intensity is modulated in accordance with information to be recorded, and thereby changing a state of at least the base material into crystal to change optical characteristics thereof; and
    reading a change in reflectivity resulting from the change in the optical characteristics to reproduce the information,
    wherein a stabilizing material exists in the base material to stabilize a steady state thereof.

2. An optical recording/reproducing method comprising the steps of:
    forming at least a base material and an assisting material on a substrate;
    externally applying energy of which intensity is modulated in accordance with information to be recorded, and thereby changing a state of at least the base material into crystal to change optical characteristics thereof; and
    reading a change in reflectivity resulting from the change in the optical characteristics to reproduce the information,
    wherein the base material is formed into a film-like form and the assisting material is formed adjacent thereto, and
    a stabilizing material exists in the base material to stabilize a steady state thereof.

3. An optical recording/reproducing method comprising the steps of:
    forming on a substrate a film of a mixture of at least a base material of which state can be changed into crystal and an assisting material;
    externally applying thereto energy of which intensity is modulated in accordance with information to be recorded, thereby changing a state of at least the base material into crystal to change optical characteristics thereof; and
    reading a change in the optical characteristics to reproduce the information,
    wherein a stabilizing material exists in the base material to stabilize a steady state thereof.

4. An optical recording/reproducing method comprising the steps of:
    forming at least a base material and an assisting material on a substrate;
    externally applying energy of which intensity is modulated in accordance with information to be recorded, and thereby changing a state of at least the base material into crystal to change optical characteristics thereof; and
    reading a change in reflectivity resulting from the change in the optical characteristics to reproduce the information,
    wherein the base material is formed into a film-like form and is mixed with the assisting material, and
    a stabilizing material exists in the base material to stabilize a steady state thereof.

* * * * *